United States Patent
Verghese

(10) Patent No.: US 7,420,738 B2
(45) Date of Patent: Sep. 2, 2008

(54) DUAL MEMBRANE SINGLE CAVITY FABRY-PEROT MEMS FILTER

(75) Inventor: Paul Mattackal Verghese, Acton, MA (US)

(73) Assignee: Axsun Technologies, Inc., Billerica, MA (US)

(*) Notice: Subject to any disclaimer, the term of this patent is extended or adjusted under 35 U.S.C. 154(b) by 23 days.

(21) Appl. No.: 10/743,238

(22) Filed: Dec. 22, 2003

(65) Prior Publication Data

US 2005/0134962 A1   Jun. 23, 2005

(51) Int. Cl.
*G02B 27/00* (2006.01)
(52) U.S. Cl. .................... 359/578; 359/579; 359/260
(58) Field of Classification Search ................ 359/578, 359/379, 260, 245, 577, 579; 372/96, 45; 73/514.26; 356/506, 454, 519
See application file for complete search history.

(56) References Cited

U.S. PATENT DOCUMENTS

| | | | |
|---|---|---|---|
| 3,498,693 A * | 3/1970 | Markin et al. .............. 359/317 |
| 6,345,059 B1 | 2/2002 | Flanders | |
| 6,384,953 B1 * | 5/2002 | Russell et al. .............. 359/245 |
| 6,407,376 B1 | 6/2002 | Korn et al. | |
| 6,424,466 B1 * | 7/2002 | Flanders .................... 359/578 |
| 6,438,149 B1 * | 8/2002 | Tayebati et al. .............. 372/45 |
| 6,509,972 B2 | 1/2003 | Korn | |
| 6,584,126 B2 | 6/2003 | Wang et al. | |
| 6,597,490 B2 | 7/2003 | Tayebati | |
| 6,608,711 B2 | 8/2003 | Flanders et al. | |
| 6,763,718 B1 * | 7/2004 | Waters et al. .............. 73/514.26 |
| 2002/0126726 A1 | 9/2002 | Flanders et al. | |

\* cited by examiner

*Primary Examiner*—Audrey Y Chang
(74) *Attorney, Agent, or Firm*—Houston Eliseeva LLP

(57) ABSTRACT

A dual membrane, single cavity MEMS Fabry-Perot filter has a cavity that is defined between two mirror structures that are located on separate MEMS membranes. This configuration can yield a number of advantages. First, the membranes will be typically subject to the same mechanical vibrations, thus, will vibrate together. This vibration, however, will be rejected as common mode, however. Moreover, since the membranes will move in opposed directions in the gravitational field, the dual membrane device is insulated against passband shifts resulting from changes in orientation in the gravitational field. Finally, since each membrane can now be deflected separately, the scanning range is effectively doubled without increases in the size of the electrostatic cavities.

12 Claims, 3 Drawing Sheets

DUAL MEMBRANE SINGLE CAVITY FABRY-PEROT MEMS FILTER

BACKGROUND OF THE INVENTION

Micro-electro-mechanical systems (MEMS) Fabry-Perot tunable filters are commercially available. These devices typically combine some sort of deflectable membrane, which, in combination with a fixed mirror, defines the tunable Fabry-Perot cavity. The size of the cavity, and therefore the spectral position of the filter's pass band, is modulated or controlled by deflecting the membrane.

Originally, these MEMS Fabry-Perot tunable filter devices were predominately used in wavelength division multiplexing (WDM) applications for telecommunications. More recently, these MEMS Fabry-Perot filters have been deployed in other applications, such as spectroscopy and medical applications, for example.

U.S. Pat. No. 6,608,711 to Flanders, et al. shows one approach for manufacturing the MEMS Fabry-Perot tunable filter. The Flanders device uses a MEMS membrane that is based on silicon-on-insulator technology. Specifically, the membrane is formed by releasing a portion of the silicon device layer from an underlying silicon handle wafer using the intervening oxide layer as the release layer. In the typical implementation, a backside port is provided. A fixed mirror is then bonded to the MEMS membrane die, in order to create the tunable Fabry Perot cavity.

The Flanders device, however, is only one example of MEMS Fabry-Perot filters. Another example is disclosed in U.S. Pat. No. 6,584,126 to Wang, et al., which is based on earlier work by Parviz Tayebati. Specifically, the Tayebati device configuration is based on a vertical cavity surface emitting laser (VCSEL) technology. It uses a high-reflecting (HR) dielectric stack mirror that is suspended on a membrane above a substrate, on which a bottom mirror has been deposited. The Tayebati device has advantages insofar as the device can be monolithically fabricated. It has disadvantages, however, associated with the difficulty in adjusting the size of the Fabry-Perot cavity, among other things.

These MEMS Fabry-Perot filters have been used in various applications. As disclosed in U.S. Pat. No. 6,509,972 to Korn, they can be used in spectrometers. The high finesse, highly-stable optical cavities of the MEMS tunable filters enable highly accurate scanning of the spectral band. See also, U.S. Pat. No. 6,407,376 to Korn, et al. Additionally, as disclosed in U.S. Pat. No. 6,345,059 to Flanders, these MEMS Fabry-Perot tunable filters can be used as the tunable elements in external cavity lasers. Finally, more recently as disclosed in U.S. patent application to Walid Atia, et al., filed on Oct. 17, 2003, assigned Ser. No. 10/688,690, the filters can also be used with semiconductor broadband sources to create a tunable signal that has advantages over tunable lasers in its stability and band of operation.

Additional innovations relative to these MEMS membranes have been disclosed. Specifically, in U.S. patent application Pub. No. US2002/0126726A1 by Flanders, et al., MEMS membranes with integral mirrors or lenses have been produced. In the typical example, a concave mirror is formed on the deflectable membrane. This allows for the formation of a curved-flat or curved-curved optical cavity. The curved-flat cavity allows for the fabrication of a high finesse filter that has lower angular alignment tolerances relative to the input beam.

Moreover, as disclosed in U.S. Pat. No. 6,424,466, to Flanders, multi-cavity, multi-membrane MEMS tunable filters have also been proposed. These combine two opposed MEMS membranes with an intervening suspended highly reflecting mirror. This creates a two-cavity device, which has improved passband performance for some applications. Specifically, the passband is modified from the standard Lorentzian passband of a single cavity for applications such as wavelength routing and also typically has improved side band rejection.

SUMMARY OF THE INVENTION

These MEMS Fabry-Perot filters, however, have suffered from a number of drawbacks for many applications. First, they can be sensitive to mechanical vibration that causes the MEMS membrane to vibrate which, in turn, results in spectral jitter of the passband. This reduces the accuracy and precision of the wavelength scan. Moreover, these systems can also be susceptible to membrane movement from gravitational acceleration. This is most relevant in handheld devices. The mass of the membrane causes some movement in the membrane, depending on the membrane's orientation in the gravitational field. Finally, still another problem associated with these MEMS membranes, is a limited scanning range. The rule of thumb for electrostatic cavities is that the membrane should not be deflected greater than one-third the size of the electrostatic cavity. Excessive deflection due to excessive drive voltages or electrostatic discharge can cause the membrane to snap down onto the handle wafer. Many times, this can result in the stiction adhesion of the membrane onto the wafer. This problem can be addressed to some degree by increasing the size of the electrostatic cavity. The larger cavity results in higher drive voltages, however.

The present invention is directed to a dual membrane, single cavity MEMS Fabry-Perot filter. The Fabry-Perot cavity is defined between two mirror structures that are located on separate MEMS membranes. This configuration can yield a number of advantages. First, the membranes will be typically subject to the same mechanical vibrations, thus, will vibrate together. This vibration, however, will be rejected as common mode, since the two membranes are nominally identical in their electromechanical characteristics. Moreover, since the membranes will move in opposed directions in the gravitational field, the dual membrane device is insulated against passband shifts resulting from changes in orientation in the gravitational field. Finally, since each membrane can now be deflected separately, the total deflection range is effectively doubled without increases in the size of the electrostatic cavities.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
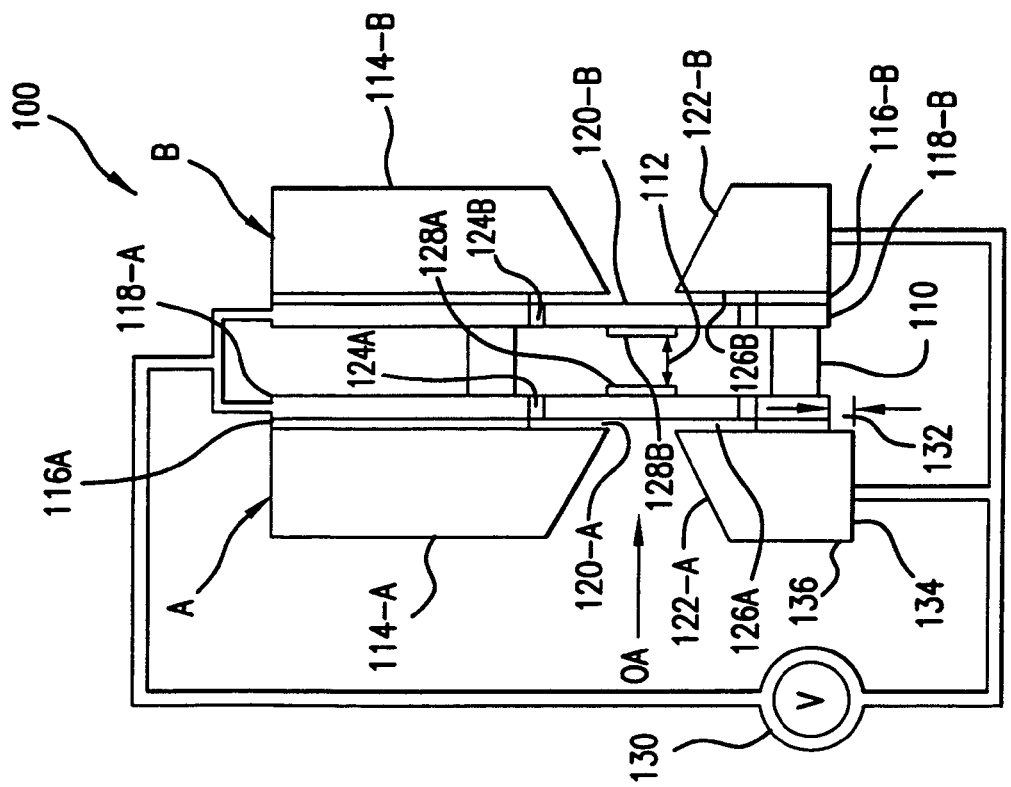
FIG. 1 is a side plan cross-sectional view of a dual membrane, single cavity Fabry-Perot tunable filter, according to the present invention.

FIG. 1 shows a dual membrane, single cavity tunable filter 100, which has been constructed according to the principles of the present invention.

In more detail, the tunable filter 100 comprises a first MEMS membrane device A and a second MEMS membrane device B. These two membrane devices A, B are installed facing each other. An intervening spacer 110 is used to define the optical cavity 112, between the mirror structures of each of these membrane devices A, B.

In the preferred embodiment, each of the membrane devices is based on the Flanders SOI MEMS membrane device. Specifically, each of the membrane devices A, B includes a handle wafer 114. (Note that the A and B designators after the reference numerals are used to indicate the corresponding membrane device.) A sacrificial oxide layer 116 is used to separate the handle wafer 114 from a device layer 118. A membrane 120 is fabricated in each of the membrane devices A, B by removing the sacrificial release layer 116 from underneath the membrane structure 120. Further, according to the preferred embodiment, a backside optical port 122 is provided in the handle wafer material or substrates 114 so that the optical signal being transmitted along the optical axis A can be injected directly into the Fabry-Perot cavity 112. Antireflective coatings are further preferably deposited on the backsides of the membranes layers 118 to minimize parasitic reflections.

In the preferred embodiment, flexures 124 are formed in the device or membrane layer 118 to control the flexibility of the membranes 120. Specifically, these flexures are formed by etching regions of the device layer 124 to create voids to thereby control the membrane's deflectability.

Each of the membrane devices A, B includes an electrostatic cavity 126. In the preferred embodiment, this is provided between the device layer 118 and the handle wafer 114. Thus, a voltage established between these two structures causes the membranes 120 to be deflected in the direction of its substrate 114 due to the electrostatic attraction force.

Generally, the membrane devices A, B are fabricated as disclosed in U.S. Pat. No. 6,608,711 to Flanders, et al., which is incorporated herein by this reference in its entirety.

Depending the implementation, the Fabry-Perot cavity 112 can be either a flat-flat, curved-flat, or curved-curved optical cavity. This choice is implemented by making or forming a curved mirror structure in none, one, or both of the membrane devices A, B. Typically, in the preferred embodiment, highly reflecting (HR) layers 128 are deposited on each of the membranes 120, along the optical axis A, to yield highly reflective mirror structures, to thereby achieve a high finesse optical cavity. Typically, the HR layers are fabricated from alternating high and low refractive index dielectric materials to yield high reflectivity, low loss mirror structures.

Specifically, in one embodiment, the membrane device A has a flat mirror structure. Specifically, the HR coating 128-A of membrane device A is deposited on a flat surface of the device layer 118-A. Further, in the preferred embodiment, the mirror layer 128-B of membrane device B mirror structure is also a flat mirror. This yields a flat-flat Fabry-Perot cavity 112.

In another embodiment, the membrane device B has a curved mirror structure. Specifically, in the preferred embodiment, this curved membrane/mirror structure is fabricated as disclosed in U.S. patent application Pub. No. US2002/0126726A1 to Flanders, et al. (which is incorporated herein by this reference in its entirety) by forming a depression in the device layer 118-B, along the optical axis OA, and depositing the reflective coating 128-B on this depression. In still a further embodiment, both membranes 120-A and 120-B of membrane devices A and B have curved mirrors structures as disclosed in the Flanders application.

FIG. 1 further shows one technique for driving the tunable filter 110, specifically, controlling the voltage across the electrostatic cavities 126A and 126B. Specifically, a voltage generator 130 is provided. It provides the same potential to each of the substrates 114A, 114B. Further, the drive voltage is then provided to each of the device layers 118A, 118B. This configuration assures that both of the membranes are experiencing effectively the same electrostatic drive force. As a result, they will behave almost identically to external mechanical vibration or orientation in the gravitational field.

In the preferred embodiment, the inventive tunable filter 100 is configured to be installed tombstone-fashion on an optical bench. In the preferred embodiment, this is achieved by creating a foot portion 136 on one of the membrane devices A or B. In the illustrated example, membrane device A has the foot portion 136. This foot portion 136 extends down by a distance indicated by reference numeral 132, below the bottom of the other membrane device B. As a result, this foot portion 136 can be bonded to an optical bench. In the preferred embodiment, a layer of solder or other adhesion metallization 134 is applied to this foot portion to enable bench bonding.

Figure 2:
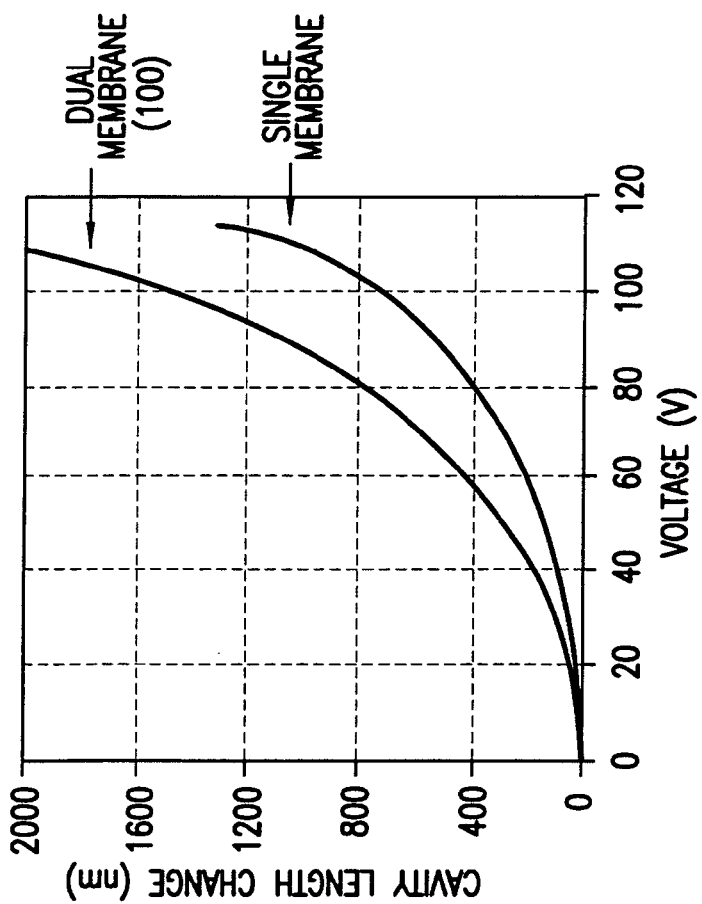
FIG. 2 is a plot of cavity length change in response to tuning voltage for the inventive dual membrane tunable filter, compared with the conventional single membrane filter.

FIG. 2 is a plot of cavity length change in nanometers as a function of drive voltage. In the drive configuration, as illustrated in FIG. 1, the deflection associated with the same drive voltage is effectively doubled relative to the deflection in a single membrane device as disclosed in U.S. Pat. No. 6,608,711, for example. That is, the dual inventive dual membrane device 100 deflected by approximately 1400 nanometers in response to a 100 volt drive voltage, whereas the single membrane device will only deflect approximately 700 nanometers. This illustrates still further advantage of the present invention whereby deflection is increased for the same applied drive voltage.

Figure 3:
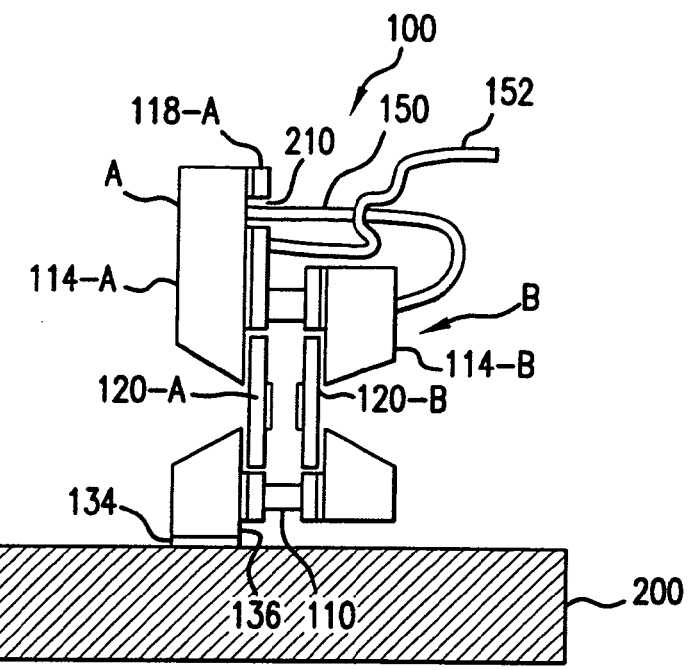
FIG. 3 is a side plan view of the inventive tunable filter bonded to an optical bench.

FIG. 3 illustrates the installation of the inventive tunable filter device 100 on an optical bench 200. Specifically, the solder layer 134 is used to bond the foot portion 136 of membrane device A to the bench 200. This shows the installation of the device 100 tombstone fashion on the bench 200. This allows the device to be used as a tunable filter in a spectrometer as disclosed in U.S. Pat. No. 6,407,376, which is incorporated herein by reference. It can also be used as a tunable filter in a tunable laser as disclosed in U.S. Pat. No. 6,340,059, to Flanders, which is incorporated herein by this reference in its entirety. Moreover, it can be used as the tunable filter, in combination with a broadband source, as disclosed in U.S. application Ser. No. 10/688,690, by Walid A. Atia, et. al., which is also incorporated herein by this reference.

FIG. 3 also shows wire bonding to each of the substrates 114 and the device layers 118 of the tunable filter 100. Typically, in the illustrated embodiment, a port 210 is provided in the device layer 118A of membrane device A. This allows for the installation of a wire bond 150 to the substrate 114A of membrane device A. A wire bond is made directly to the backside of the substrate 114B of membrane device B. Further, a second wire bond 152 is made directly to the device layer 118A of device A. When the spacer 110 is made out of a conductive material, such as gold, then this wire bond will result in both of the membranes 120A, 120B receiving the same drive voltage.

Figure 4:
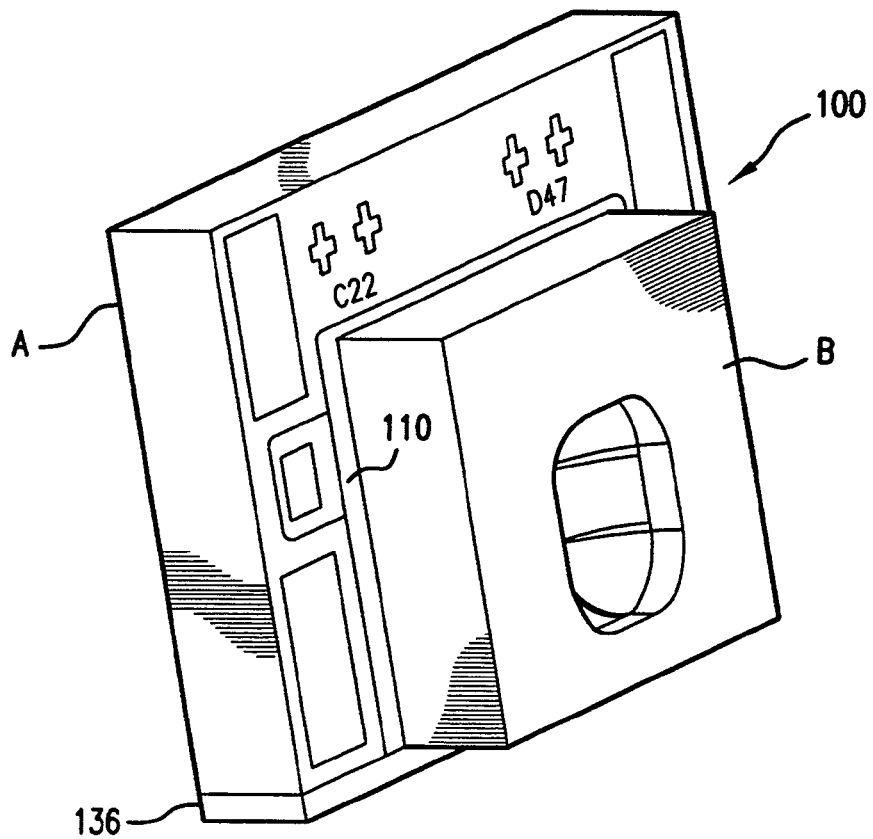
FIG. 4 is a perspective view of the inventive dual membrane single cavity tunable filter.

FIG. 4 shows dual membrane tunable filter 100, according to the present invention. Specifically, it shows membrane device A being bonded to membrane device B, with the intervening spacer 110. The foot portion 136 is provided on device A to enable the tombstone mounting on an optical bench.

Figure 5:
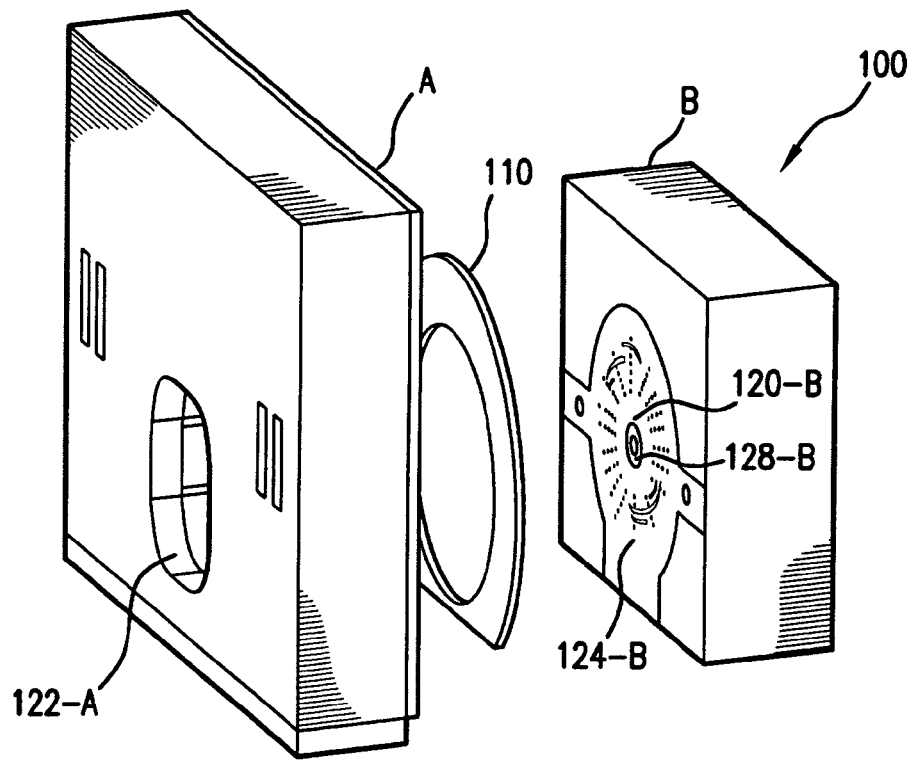
FIG. 5 is an exploded perspective view of the inventive filter.

FIG. 5 is an exploded view of the tunable filter device 100. It shows the membrane device A, detached from membrane device B, with the intervening spacer 110. Also shown is the HR layer 128B of the mirror structure on the second membrane device B. Further, flexures 124B are shown defining the membrane 120B of the membrane device B. Further, the backside optical port 122A of the first device A is further shown.

Figure 6:
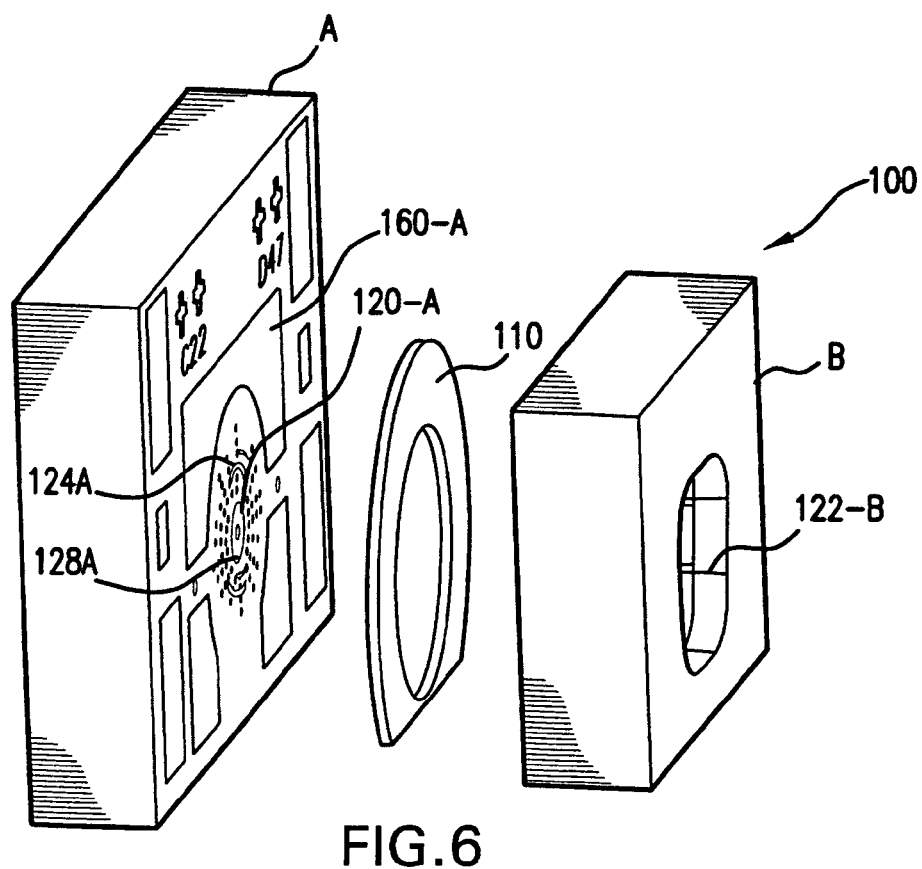
FIG. 6 is an exploded perspective view of the inventive filter from another angle.

FIG. 6 is another exploded view of the inventive tunable filter device 100. This shows the membrane 120A of the first membrane device A. Also shown are metallizations 160A for bonding to the spacer 110. This view also shows the backside optical port 122B of the second membrane device B.

Other drive configurations can also be used. In another example, the first membrane device and the second membrane device are driven independently. Specifically, two voltage generators are used: one that establishes a drive voltage across the electro-static cavity 126A of the first membrane device A and a second voltage generator that establishes an electrostatic drive voltage across the second electro-static cavity 126B of the second membrane device B. The size of the Fabry-Perot cavity 112 can be thus further modulated by establishing an electrostatic drive voltage between each of the membranes 120A, 120B. This will cause the membranes to be deflected toward each other into the cavity 112 to enable further modulation of the size of the cavity 112.

While this invention has been particularly shown and described with references to preferred embodiments thereof, it will be understood by those skilled in the art that various changes in form and details may be made therein without departing from the scope of the invention encompassed by the appended claims.

What is claimed is:

1. A single cavity dual membrane Fabry-Perot filter comprising:
   a first membrane device comprising: a first membrane holding a first mirror structure, a first substrate for supporting the first membrane and defining a first electrostatic cavity between the first membrane and the first substrate, an electrostatic voltage between the first membrane and the first substrate causing deflection of the first membrane relative to the first substrate; and
   a second membrane device comprising: a second membrane holding a second mirror structure, which is opposed the first mirror structure, to thereby define a Fabry-Perot cavity between the first mirror structure and the second mirror structure, a second substrate for supporting the second membrane and defining a second electrostatic cavity between the second membrane and the second substrate, an electrostatic voltage between the second membrane and the second substrate causing deflection of the second membrane relative to the second substrate.

2. A Fabry-Perot filter as claimed in claim 1, further comprising a spacer between the first membrane device and the second membrane device for controlling a size of the Fabry-Perot cavity.

3. A Fabry-Perot filter as claimed in claim 1, wherein the first mirror structure and the second mirror structure are flat mirrors.

4. A Fabry-Perot filter as claimed in claim 1, wherein at least one of the first mirror structure and the second mirror structure is curved mirror structure.

5. A Fabry-Perot filter as claimed in claim 1, wherein, the both the first mirror structure and the second mirror structure are curved mirrors.

6. A Fabry-Perot filter as claimed in claim 1, wherein the membrane devices comprise respective substrates, the membranes being deflected by the establishment of electrostatic drive voltages between the substrates and the membranes.

7. A Fabry-Perot filter as claimed in claim 6, further comprising an optical port through at least one of the first substrate and the second substrate.

8. A Fabry-Perot filter as claimed in claim 1, wherein the mirror structures comprise highly reflecting dielectric mirrors.

9. A Fabry-Perot filter as claimed in claim 1, wherein a drive voltage generator establishes a voltage in the first electrostatic cavity and the second electrostatic cavity.

10. A Fabry-Perot filter as claimed in claim 1, wherein a drive voltage generator establishes a drive voltage between the membrane of the first membrane device and the membrane of the second membrane device.

11. A Fabry-Perot filter as claimed in claim 1, wherein first membrane comprises flexures enabling the deflection of the first membrane relative to the first substrate and second membrane comprises flexures enabling the deflection of the second membrane relative to the second substrate.

12. A Fabry-Perot filter as claimed in claim 1, further comprising a first optical port through the first substrate and a second optical port through the second substrate.

* * * * *